Feb. 26, 1963  J. F. VOSBURG  3,078,560
METHOD OF CUTTING RUBBER AND THE LIKE
Filed Nov. 23, 1959  2 Sheets-Sheet 1

INVENTOR.
JOHN F. VOSBURG
BY
Bean, Brooks, Buckley & Bean.

Feb. 26, 1963     J. F. VOSBURG     3,078,560
METHOD OF CUTTING RUBBER AND THE LIKE
Filed Nov. 23, 1959     2 Sheets-Sheet 2

INVENTOR.
*JOHN F. VOSBURG*

BY

*Bean, Brooks, Buckley & Bean.*

United States Patent Office 3,078,560
Patented Feb. 26, 1963

3,078,560
METHOD OF CUTTING RUBBER AND THE LIKE
John F. Vosburg, 340 Broad St., Salamanca, N.Y.
Filed Nov. 23, 1959, Ser. No. 854,627
5 Claims. (Cl. 29—423)

This invention relates generally to the forming of a printing surface on a member of normally resiliently compressible material such as rubber, and more specifically to a new and useful method of cutting a desired surface into such material.

Printing rollers for high quality wallpaper, gift wrapping paper, and the like heretofore customarily have been made of metal, to provide a printing surface having the requisite preciseness and definition. Metal is not a natural printing medium, as contrasted for example with rubber and similar materials which have considerable affinity for printing inks, and therefore the use of metal is disadvantageous in that the ink must carry a considerable size or body to give proper adherence to the metal, with the result that considerable drying time is required after printing. However, metal has the advantage that it can be easily machined, by means such as a router, to provide the precise definition and registration essential to high quality multi-color and like printing.

Notwithstanding the higher quality heretofore provided only by metal, manufacturers of gift wrapping papers have been switching to the use of a rubber printing surface. The affinity of rubber for printing inks means that relatively thin inks can be used, enabling printing and drying at approximately twice the rate possible when using a metal roller.

The primary disadvantage heretofore encountered in the machine manufacture of a rubber printing roller was that the material could not be routed satisfactorily unless it had a degree of hardness such that it was unsuitable as a printing surface. For example, experiments revealed that the rubber material should have a Shore A durometer hardness of approximately 85 to be routable, whereas a Shore A durometer reading in the range of 48 to 53 is desired for printing. As a result, it has been the practice to cut the rubber printing surface with a knife, by hand, which is a relatively slow process greatly increasing the cost of the rubber roller. In addition, rubber of that hardness is resiliently yieldable under the cutting pressure, producing distortion of the printing surface with the result that when such rollers are used to print a multi-colored pattern the different colors frequently overlap, because the respective rubber printing surfaces do not register properly. While this lower quality might be acceptable for some purposes, it definitely is not desirable, and for many uses, such as the printing of fine gift wrapping papers, it can not be tolerated.

Accordingly, the primary object of my invention is to provide a method of cutting a printing surface in a member of normally resiliently compressible material, such as rubber, by high speed cutting means such as a router.

In one aspect thereof, the method of forming a printing surface on a normally resiliently compressible member, in accord with my invention, comprises supporting the member within a refrigerated gaseous medium, exposing the member to the medium until the material of the member is frozen, cutting the desired printing surface into the material of the member while continuing to expose it to the freezing medium, and thereafter removing the member from the medium.

The foregoing and other objects, advantages and characterizing features of the method of my invention will become clearly apparent from the ensuing detailed description of a presently preferred embodiment thereof, taken in conjunction with the accompanying drawings illustrating a presently preferred form of apparatus of my invention for carrying out the method of this invention, wherein like reference numerals denote like parts throughout the various views and wherein.

Figure 1:
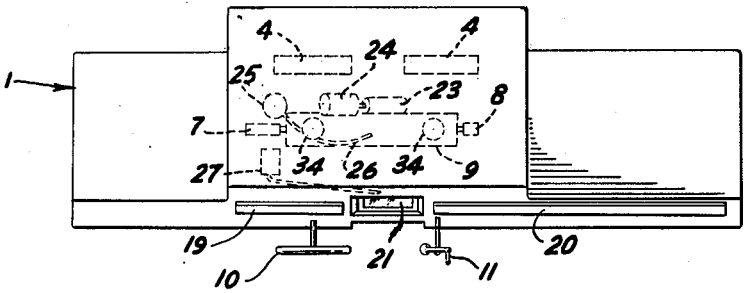
FIG. 1 is a top plan view of the apparatus, with certain internal parts indicated in phantom.

In accord with my invention, the material in which the printing surface is to be cut, and which normally is resiliently yieldable, comprising for example a solid rubber roller, is frozen to the necessary hardness enabling it to be cut satisfactorily by means of a router, or other tool. In this way, rubber and like materials normally having the lesser degree of hardness desired for printing, are temporarily given the added degree of hardness necessary for satisfactory cutting by high speed machinery such as a router.

I am aware that it has been proposed to form porous material such as crepe and sponge rubber by compressing the same, to eject air from the cells thereof, then filling the evacuated cells with water and thereafter freezing the same. However, that method is suitable only for use with spongy materials of an extremely open, porous cell structure, having a durometer reading of for example 10 or less, and is not suitable for use with rubber and like printing materials having a durometer reading in the neighborhood of 48–53, with which this invention is concerned. This is because the cells of such harder material are not sufficiently large and open to permit the necessary impregnation thereof with a liquid for subsequent freezing. Therefore, another, different method of freezing the material is required.

Furthermore, certain additional problems are encountered. For example, the pattern to be cut normally is printed on the surface of the roller, to guide the operator doing the cutting. Therefore, the surface of the roller must be maintained free of obstruction to vision, so that the operator can see the pattern. This means that freezing the roller only from interiorly thereof, by placing Dry Ice or other refrigerant in the hollow center of the cylinder, is not suitable because condensation forms on the exterior of the cylinder due to the warmth of the ambient atmosphere. This method will freeze the roller sufficiently hard to make it routable. However, ice forms on the roll, because of the condensation, making it difficult, if not impossible, for the operator to see the pattern. Attempts to remove the ice are apt to smudge the design.

An additional problem is encountered with this method in that, as the roller is routed, the routed chips of material must be removed. When working with metal, this is conveniently done by a blower, but a warm air blower on an internally frozen rubber roller warms up the external surface of the roller, thereby reducing its routability.

These problems are overcome, and the material is successfully frozen, with the method of my invention which has as its first step placing the roller to be frozen within a refrigerated, sealed enclosure, whereby the roller is enclosed within a refrigerated gaseous atmosphere. The roller is frozen by contact with the refrigerated gas, and is insulated from the normal atmospheric humidity exteriorly of the enclosure. Continued exposure of the roller to the freezing medium, which can be air at from 20 to 40 degrees below zero, on the Fahrenheit scale, freezes the roller to a degree of hardness approximating a Shore A durometric reading of 85, at which point it is routable.

Then, the rubber roller is cut, by a router, while in the refrigerated atmosphere. In other words, instead of removing the material from the refrigerated atmosphere to work on it, which has the disadvantage that the material immediately begins to warm up, I keep the roller in the refrigerated atmosphere and continue to expose it to the freezing medium while working on it, whereby the roller is not exposed to any warmer or more humid air, and any heat resulting from the cutting operation is immediately dissipated in the surrounding refrigerated atmosphere.

By this method, the formation of condensation is maintained at a minimum, because there is relatively little water vapor to be condensed. Indeed, it is held to such a low degree that any condensation which is formed can be removed by a brushing operation so light that it does not interfere with the printed design.

To remove the routed, frozen chips of material, I blow air at the point of routing, using the refrigerated air comprising the atmosphere in which the roller is maintained while it is being routed. By this means, the material is not warmed as the chips are blown away.

Then, when the desired printing surface has been completely routed, the roller is removed from the refrigerated atmosphere for any desired finishing treatment. Once it has warmed up to a normal temperature, the roller has the same characteristics that it had before freezing, providing a highly desirable printing surface which has a preciseness of design heretofore not possible with rubber or like rollers.

The foregoing method is expeditiously carried out by the apparatus of my invention comprising, in the form illustrated in the accompanying drawing, an insulated cabinet, generally designated 1, and having top, bottom, front, rear and opposite end walls each carrying insulating material 2 of appropriate thickness, with the top wall 3 of the higher, central portion of the cabinet being removable, if desired. A refrigerating system is provided, including refrigerating coils 4 positioned interiorly of the cabinet, whereby the interior of the cabinet can be refrigerated to a relatively low temperature such as in the range of −20° F. to −40° F. The two refrigerator units are so cycled that they alternate, going through a defrosting period when moisture which has been collected and frozen on the coils is drained out of the system. In this manner, the refrigerator coils control of the moisture within the cabinet, keeping it very low whereby the air in the cabinet is quite dry. The details of the refrigerating system are not illustrated or described, because any conventional refrigerating system can be used, the important factor being that means are provided for refrigerating the interior of the cabinet.

A work support is provided in the form of a bed 5 having ways guiding the movement of a carriage 6, carrying a head stock 7 and tail stock 8 upon which the roller to be cut, indicated at 9 (FIG. 1), is mounted. In this way, the roller comprising the workpiece is supported within the cabinet for movement lengthwise of base 5, under control of an external operating lever 10, and for rotation about its lengthwise axis under the control of an external operating lever 11, in the manner of a workpiece on a lathe.

Figure 2:
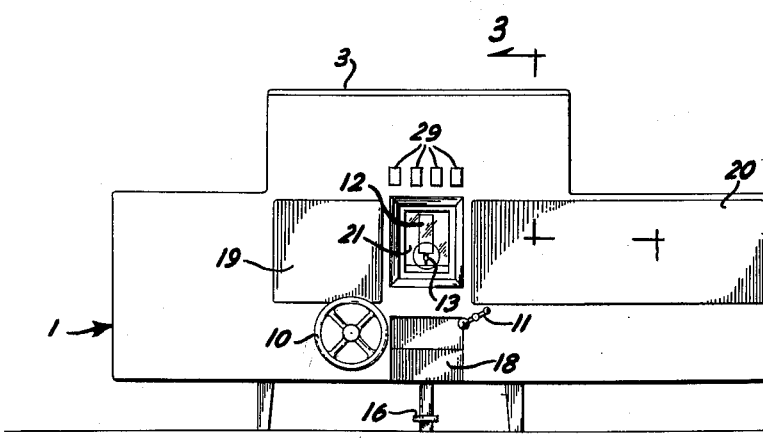
FIG. 2 is a front elevational view thereof.
Figure 3:
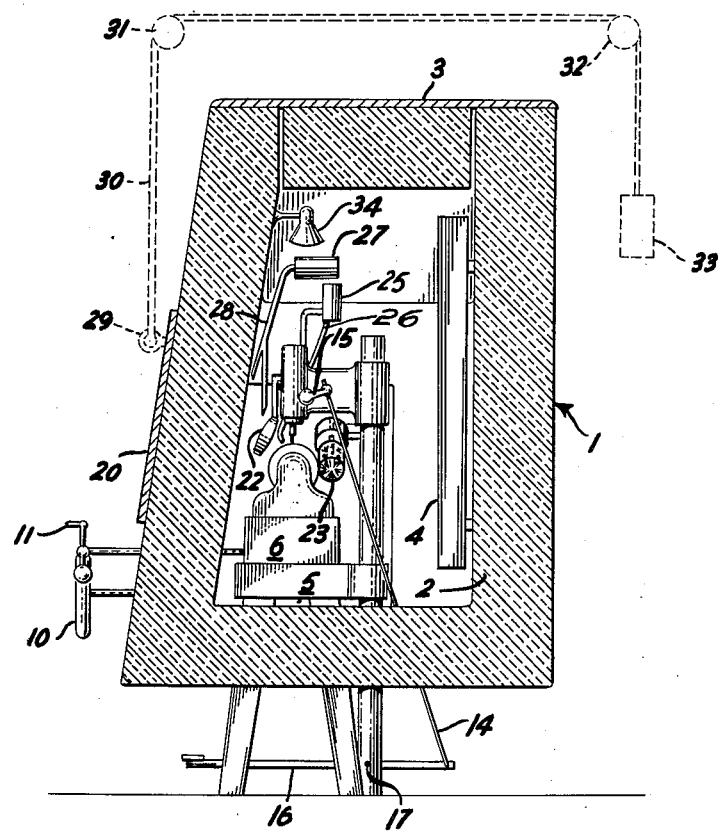
FIG. 3 is a transverse sectional view thereof on an enlarged scale, taken about on line 3—3 of FIG. 2.

A routing spindle head 12 is positioned adjacent the workpiece, and carries a routing tool 13 (FIG. 2) which is raised and lowered through means including a connecting rod 14 extending through the housing bottom wall into engagement at one end with an arm 15, rotation of which results in vertical reciprocation of the routing tool 13. At its opposite end, the connecting rod 14 is connected to a foot-operated lever 16 pivoted, at 17 exteriorly of the cabinet and extending toward the front thereof between the operating handles 10 and 11, in line with a recessed knee space 18 (FIG. 2). Access doors 19 and 20 are provided on the front wall of the cabinet for opening the same to make repairs to the machinery, and to install and change the workpiece, the doors being held closed by any desired type of fastening, not illustrated. Counterweights 33 can be provided to balance the doors, being connected thereto by cables 30 trained over pulley sheaves 31 and 32 and secured to eyes 29 on the doors, as indicated in phantom in FIG. 3.

The front wall of the cabinet is provided with a viewing window 21, of the insulated, thermopane type, in line with workpiece 9 and router head 12, and a magnifying glass 22 is positioned within the cabinet between window 21 and workpiece 9 to magnify the area being worked on. This compensates for the greater distance between the operator and the workpiece, resulting from placing the workpiece within the cabinet.

In use, an operator sits in front of the cabinet, manipulating the operating levers 10 and 11, with his hands, to move the workpiece as required to follow the pattern thereon, and manipulating the lever 16 with his foot, to raise and lower the cutting tool bit 13, as required. The operator views the work area, which is magnified, through window 21, and operates the router in the normal manner except by a more remote control.

A brush 23, driven by a motor 24, is arranged to brush off any frost which might form on the workpiece 9, it being understood that only a very light brushing action is ever required. A blower 25 has an outlet duct 26 (FIGS. 1 and 3) positioned to blow refrigerated air from within the cabinet onto the workpiece in the area of routing, to blow away the routed chips.

A small amount of air is heated, by a heater 27, and blown gently through duct work 28 over the surface of the magnifying glass 22 and the thermopane window 21, to remove any condensation thereon, it being understood that only a slight amount of warm air is required for this purpose. Heater 27 and ducts 28 are positioned far enough from workpiece 9 and the router so as not to interfere with the freezing and routing of the workpiece.

A number of switches 29 are provided for the control of the various motors, the heater, and internal lights as indicated at 34, in a manner which will be understood in the art.

Accordingly, it is seen that my invention fully accomplishes its intended objects, providing a method of cutting a printing surface on a resiliently yieldable material, such as rubber, to provide a printing surface having all of the desirable printing characteristics of rubber while also providing a printing surface having extremely precise definition and register. It will be appreciated that whereas the foregoing detailed description has made repeated reference to rollers, this invention is applicable to any type of printing surface, whether it be flat, a roller, or however it might be formed. Also, the method of my invention as herein described can be varied and modified without departing from the spirit of my invention or the scope of the appended claims.

Having fully disclosed and described my invention and its mode of operation, what I claim as new is:

1. The method of forming a printing surface on a member of normally resiliently compressible material such as rubber which comprises, supporting said member within a gaseous medium having a temperature below 0° F., exposing said member to said medium until said material is frozen, cutting the desired printing surface into said material while continuing to expose said member to said medium, and thereafter removing said member from said medium.

2. The method of forming a printing surface on a member of normally resiliently compressible material such as rubber having a Shore A durometer hardness within the range of from about 40 to about 60 which comprises, surrounding said member with a gaseous medium having a temperature of no more than about 0° F. until said material is frozen to a Shore A durometer hardness of approximately 85, cutting said material to provide the desired printing surface while continuing to expose said member to said medium, and thereafter removing said member from said medium.

3. The method of forming a printing surface on a member of normally resiliently compressible material such as rubber having a Shore A durometer hardness reading within the range of from about 40 to about 60 which comprises, exposing said member to a low temperature gaseous medium until said material is frozen to a Shore A durometer hardness of about 85, routing said frozen material to produce the desired printing surface while continuing to expose said member to said medium, and thereafter removing said member from said medium.

4. The method of forming a printing surface on a member of normally resiliently compressible material which comprises, supporting said member within a gaseous medium having a temperature sufficiently low to freeze said material to a Shore A durometer hardness of approximately 85, exposing said member to said medium until said material is frozen to about said hardness, routing said material to produce the desired printing surface while exposing said member to said medium, blowing said medium on said member adjacent the point of routing to blow chips of routed material therefrom, and thereafter removing said member from said medium.

5. The method set forth in claim 4, together with the step of lightly brushing any frost from said member adjacent the point of routing.

References Cited in the file of this patent
UNITED STATES PATENTS

| | | |
|---|---|---|
| 2,322,129 | Hawkins | June 15, 1943 |
| 2,690,703 | Creek | Oct. 5, 1954 |
| 2,731,713 | Schaefer | Jan. 24, 1956 |
| 2,821,016 | Dickson | Jan. 28, 1958 |
| 2,855,664 | Griffith et al. | Oct. 14, 1958 |